United States Patent [19]

Zato

[11] Patent Number: 4,626,847

[45] Date of Patent: Dec. 2, 1986

[54] REMOTE CONTROL TRANSMITTER SYSTEM

[75] Inventor: Thomas J. Zato, Palatine, Ill.

[73] Assignee: Zenith Electronics Corporation, Glenview, Ill.

[21] Appl. No.: 566,087

[22] Filed: Dec. 27, 1983

[51] Int. Cl.⁴ .......................... H04Q 1/00; H04Q 7/00; G08C 19/00

[52] U.S. Cl. ..................... 340/825.56; 340/825.07; 340/825.24; 340/825.52; 340/825.76; 340/696; 358/194.1; 364/709

[58] Field of Search ...................... 340/825.07, 825.06, 340/825.24, 825.52, 825.56, 825.69, 825.72, 825.76, 365 S, 365 R, 365 VL, 696, 825.83, 825.22, 365 A; 364/140, 709; 455/603; 358/194.1; 200/159 B

[56] References Cited

U.S. PATENT DOCUMENTS

| | | | |
|---|---|---|---|
| 4,099,246 | 6/1978 | Osborne et al. | 364/709 |
| 4,341,197 | 6/1980 | Butts | 126/39 |
| 4,349,712 | 9/1982 | Michalski | 200/159 B |
| 4,362,911 | 12/1982 | Sears et al. | 200/159 B |
| 4,400,596 | 8/1983 | Fukukura et al. | 200/159 B |
| 4,409,450 | 10/1983 | Blades | 200/159 B |
| 4,412,218 | 10/1983 | Niitsu | 340/825.56 |
| 4,482,947 | 11/1984 | Zato et al. | 364/138 |
| 4,495,654 | 1/1985 | Deiss | 455/151 |

*Primary Examiner*—Ulysses Weldon
*Assistant Examiner*—David W. Olson

[57] ABSTRACT

A hand-held remote control transmitter for controlling a plurality of functions in a number of different devices includes a matrix keyboard comprising keys operating two independent switches with a single depression, with the first switches selecting a memory page in an IC and the second switches selecting a function code on the page by the X-Y key closure. A multi-position device switch accesses the memory page associated with the selected device. The first switches of each of a group of redefinable keys that perform the same functions in each of the different devices are connected to the multi-position device switch. The independent switches are formed by overlying two conventional membrane switches with the lower one providing tactile sensation.

1 Claim, 5 Drawing Figures

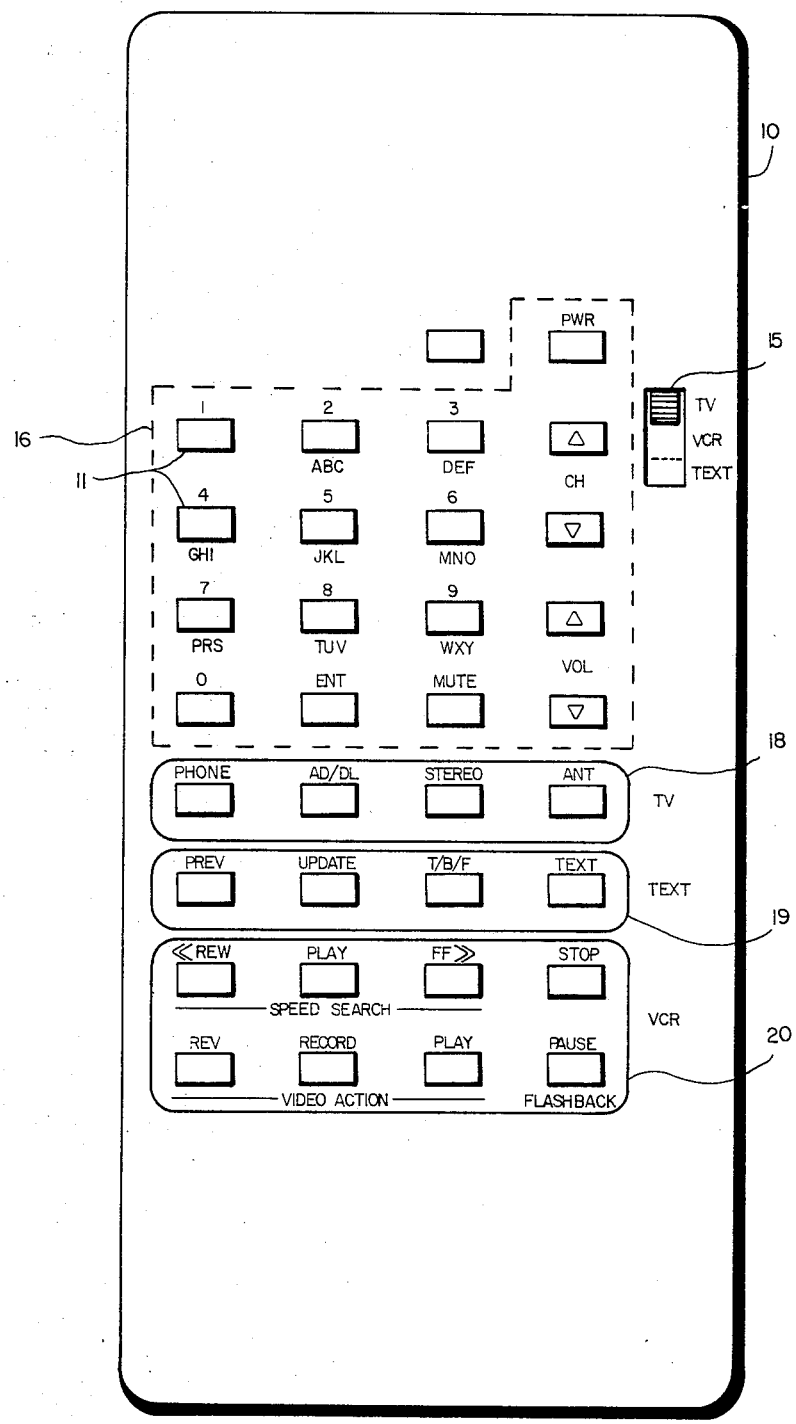

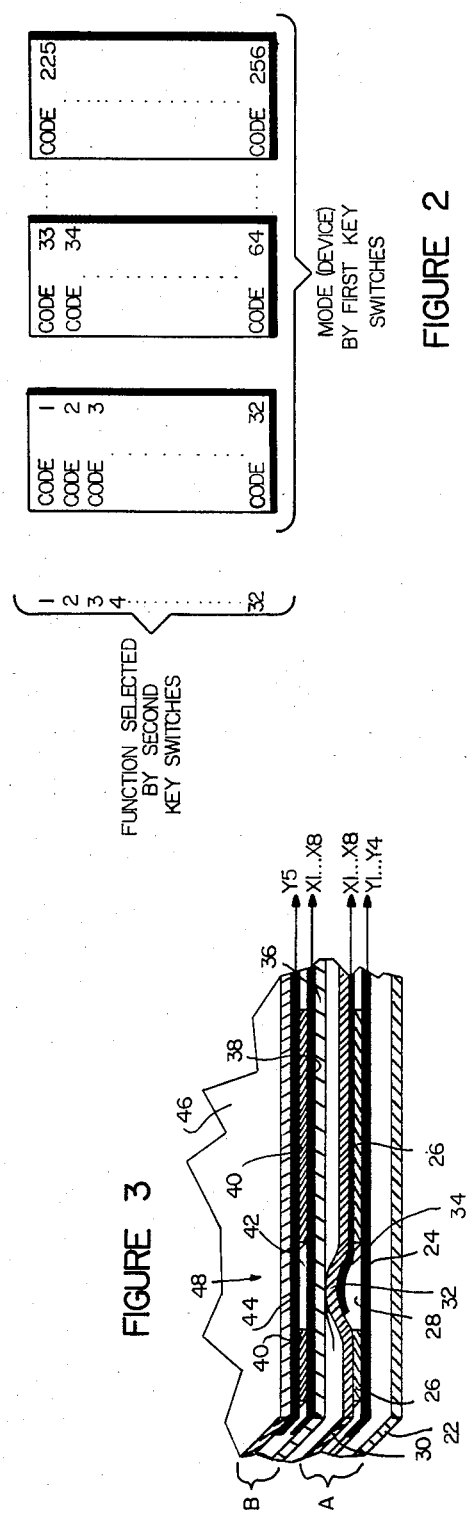
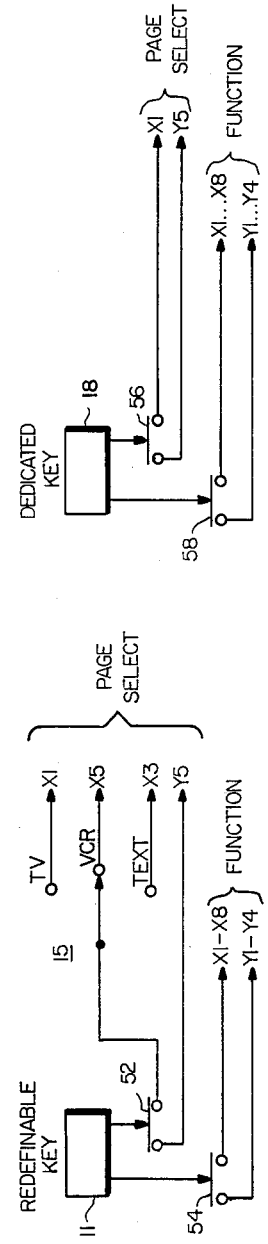

REMOTE CONTROL TRANSMITTER SYSTEM

CROSS-REFERENCE TO RELATED APPLICATION

This invention is related to and uses apparatus disclosed and claimed in a co-pending application, Ser. No. 367,827, filed Apr. 12, 1982 of T. Zato and P. Skerlos, entitled "Multi-Function, Multi-Unit Remote Control System and Method Therefor", now U.S. Pat. No. 4,482,947, issued Nov. 13, 1984; and assigned to Zenith Electronics Corporation, which application is hereby incorporated by reference.

BACKGROUND OF THE INVENTION AND PRIOR ART

This invention relates generally to remote control systems and particularly to remote control transmitters for use in controlling a plurality of functions in a number of controlled devices. The disclosure of the co-pending application mentioned above briefly describes the development of wireless remote control systems for remotely controlling apparatus such as model airplanes, toy automobiles, a variety of industrial machines and home entertainment devices. The systems of particular interest as those related to control of home entertainment devices, specifically those used for controlling a television receiver (TV), a video cassette recorder (VCR) and many other entertainment or information media useful with a television receiver. Examples of these are teletext systems (TEXT) for bringing a wide variety of information to the home, cable television systems and wireless telephone systems which enable telephone communications through the medium of a television receiver. Specifically, an integrated circuit (IC) is provided in a hand-held transmitter with a code signal generator and memory for developing and transmitting a plurality of infra-red coded output signals as a function of closure of keys or buttons on a matrix keyboard. The keyboard is conventional and is of the generally well known calculator type that completes an X-Y connection with each key closure. Specifically, a 32 key keyboard has eight "X" positions and four "Y" positions. The above application describes a Y5 port on the IC for selecting a specific memory "page" from among the eight pages provided as a function of the particular X port to which the Y5 port is connected. Any of the eight pages of memory may be accessed by hard-wiring the Y5 port to different ones of the X ports. A mask program option is also provided to enable the keyboard to access more than one memory page. This option is selected by a "default" condition, where there is no connection between Y5 and the X ports. An X-Y discriminator generates the device or memory page address code in accordance with the X-Y closures based upon the predetermined correlation pattern built into the discriminator. Thus, while a single transmitter is capable of accessing different memory pages, the mask option is not changeable without redoing the IC.

The advantages of the above-described scheme for a home entertainment equipment manufacturer are many. While not a critical requirement, a highly desirable attribute for remotely controllable devices produced by a manufacturer is that the control transmitters therefor, be capable of controlling the same function in the same type devices produced over the years. Thus, for example, if one purchases a 1983 Zenith Radio Corporation infra-red remote control TV, its control transmitter would also control the same functions in a 1982 Zenith infra-red remote control TV, in a 1984 Zenith remote control TV, etc. Similarly, remotely controllable video cassette recorders would have this same "forward and backward compatibility". Quite obviously such an attribute has great appeal to users.

There is another, equally important, reason that is grounded on the likelihood of a user owning more than one remotely controllable device, and the probability that such devices would be located in the same general area. For example, it is not at all unusual for a user to have a remotely controlled TV and a remotely controlled VCR, made by the same manufacturer, positioned adjacent to each other. In addition other special television services, options and features such as, for example, teletext, cable and wireless telephone may be available. The user may even have a projection type TV in which the viewing screen is raised and lowered by remote control. It can readily be seen that in such an environment, it is mandatory that control signals for the TV not operate the VCR, etc.

With the transmitter IC described in the above application, 256 different code combinations (memory locations) are available with an 8×4 keyboard matrix. Thus by using the Y5 teaching and a separate memory page for the different control codes for each device, a manufacturer may produce individual remote control transmitters for a variety of devices with complete independence therebetween, since each transmitter would only access the particular memory page corresponding to its associated controlled device.

For the further convenience of users, manufacturers are incorporating multi-device control functions in a single transmitter. As suggested in the co-pending application, this may be accomplished by providing a separate multi-pole switch on the transmitter for switching the Y5 connection among the X ports to access the memory page for the particular device to be controlled. A major drawback is that the entire keyboard is thereby switched and failure to note the position of the device switch could have surprising and sometimes unusual results. For example, one could easily raise or lower a projection screen while intending to perform a totally different function with a VCR, since the selected device switch position results in the entire keyboard accessing the corresponding device memory page. Thus if the device switch was on TV, but the user thought it was on VCR, the TV functional response obtained by a key operation could be disconcerting, at least. Another drawback is that the graphics would often need double or triple labeling of the keys.

As noted, it has been found most convenient to store the digital codes of the control functions applicable to a particular device in a single memory page, primarily for the above-mentioned reasons of compatibility. What is desired and needed in the art is a mechanism for enabling certain keys on the keyboard to be "redefinable" among a number of devices and others to be "dedicated" to a particular device. The redefinable keys would control the same function in a group of different devices depending upon the position of a device switch, whereas the dedicated keys would only control their associated devices, irrespective of the position of the device switch. This is accomplished in the invention by providing two independent contact closures or switches for each key operation, one for selecting the device to be controlled (memory page) and the other for defining the control function. Certain keys for common functions are redefined with a device switch, while the other keys are unique to a particular device. The invention yields attractive benefits in cost and packaging and retains the advantages of compatibility and elimination of unanticipated functional responses resulting from user errors. The packaging benefit of the invention contributes to keeping the transmitter uncluttered, enables convenient grouping of functions on the transmitter and materially simplifies the transmitter graphics—all of which should contribute to enhanced user acceptance of such combination transmitters.

OBJECTS OF THE INVENTION

The principal object of the invention is to provide an improved remote control transmitter.

Another object of the invention is to provide a multi-device, multi-function remote control transmitter which minimizes the effects of user errors.

A further object of the invention is to provide a multi-device, multi-function remote control unit that is much simpler to use than those in the prior art.

SUMMARY OF THE INVENTION

In accordance with one aspect of the invention a remote control transmitter for controlling a plurality of functions in a number of devices includes a keyboard having a first group of dedicated keys for controlling selected functions in corresponding devices and a second group of redefinable keys for controlling the same function in a number of devices as determined by the position of a device select switch. The keyboard is arranged such that each key operation actuates two independent sets of contacts.

BRIEF DESCRIPTION OF THE DRAWINGS

Further objects and advantages of the invention will be apparent upon reading the following description in conjunction with the drawings in which:

FIG. 1 represents the top view of a remote control transmitter constructed in accordance with the invention;

FIG. 2 illustrates the memory organization of the transmitter IC;

FIG. 3 is a cross section of an area beneath one key of a double membrane type keyboard constructed in accordance with the invention;

FIG. 4 is a partial schematic diagram of a redefinable function key and its contacts; and FIG. 5 is a partial schematic diagram of a dedicated TV function key and its contacts.

DESCRIPTION OF THE PREFERRED EMBODIMENT

Referring to FIG. 1, a hand-held remote control transmitter 10, similar to those available from Zenith Radio Corporation, but modified in accordance with the present invention, is disclosed. Transmitter 10 includes a first plurality of appropriately labelled keys 11 and a three position device switch 15. Keys 11 are preferably momentary contact push buttons that operate double membrane type switches to be more fully described. A second plurality of similar keys 18, 19 and 20 is also provided. Transmitter 10 will be understood to include the IC and other structure disclosed in the above-mentioned co-pending application, but with a double membrane switching arrangement to be described. The keys 11, enclosed within a dashed line block 16, are characterized herein as being "redefinable". The keys are redefined by movement of device switch 15 to the appropriate one of its three positions, which are indicated as TV, VCR, and TEXT. Keys 18 are indicated as being for TV, keys 19 for TEXT and keys 20 for VCR, respectively. Keys 18, 19 and 20 are thus "dedicated" in that they only relate to specific devices. Key 18a, located at the top center of the transmitter, is also dedicated to TV.

FIG. 2 very generally illustrates the arrangement of the memory in the IC of the remote control transmitter. It will be appreciated that the memory is constructed with eight pages of 32 addresses each with the individual pages being selected by the particular one of the X ports that is connected to the Y5 input to the IC, all as fully described in the aforementioned co-pending application. Thus, for each of the 32 X-Y key closures, eight different codes are available by connecting Y5 to different ones of the X ports. In accordance with the invention, each key operation closes two independent sets of contacts with one set making a Y5-X connection and the other set making a conventional X-Y connection. With the double contact set arrangement, the keys may be conveniently established as dedicated and redefinable.

FIG. 3 illustrates a partial cross section, directly under a key, of the double membrane switch arrangement used in the invention. It should be understood that each of the two separate membrane switches illustrated (indicated as A and B) is well known in the art. The A membrane switch desirably yields a tactile sensation when a key is depressed due to the temporary collapse of a mylar type dome which forces a contact on its inner surface down, making an electrical connection to a contact immediately below. The B membrane switch is also well known, but does not have the tactile sensation characteristic of A; it merely makes contact between two conductive strips by application of pressure from above. It will be further appreciated that the arrangements of the conductive strips on the insulating membrane are well known in the art as is the structure for making contact to the conductive strips and the key operating and return mechanism.

Membrane switch A includes an insulating base 22, preferably of a mylar type plastic material on which a strip conductor 24 is formed in an appropriate pattern. Overlying strip conductor 24 is an insulator membrane 26, which may include an aperture 28 for enabling an electrical connection to be made to strip conductor 24. An upper insulating layer 30 includes a collapsible membrane "bubble" or dome 32 with a flexible strip conductor 34 formed on the underside of insulator 30 and dome 32. When the membrane dome collapses, strip conductor 34 will make contact, through aperture 28 in insulator 26, with strip conductor 24 to close the appropriate circuit. As indicated, strip conductor 24 is connected to any of the Y1-Y4 ports and strip conductor 34 is connected to any of the X1-X8 ports. Membrane switch A is in all other respects conventional.

Overlying membrane switch A is another conventional membrane switch B comprising an insulating mylar base 36 upon which is formed a strip conductor 38, an insulator membrane 40, having an aperture 42 to enable contact to be made to strip conductor 38, and a strip conductor 44 formed on the underside of an upper insulator membrane 46. An area 48 is indicated where pressure from the key on the keyboard is applied to initially make a mechanical and electrical connection between strip conductor 44 and strip conductor 38 via aperture 42, and subsequently, upon continued downward movement of the key, to collapse dome 32 to make mechanical and electrical contact between strip conductor 34 and strip conductor 24. Thus, upon depression of a key on the keyboard, two independent sets of contacts are closed in sequence. The first set closed makes a Y5-X connection for selecting the memory page, and hence the device to be controlled, and the second contact set closure makes the normal X-Y connection. The apparatus and technique of scanning the keyboard by an oscillator in the transmitter and recognition of the X-Y closures are likewise fully disclosed in the co-pending application.

In FIG. 4 a redefinable key 11 is shown for sequentially operating two switches 52 and 54, with switch 52 being operated first, followed by operation of switch 54. One contact of switch 54 is connected to device switch 15 for selecting among TV, VCR, and TEXT as indicated by the arrows labeled X1, X5 and X3. The other contact is supplied directly to the Y5 port. Consequently, switch 52 is the page-select switch. Switch 54, on the other hand, conventionally selects the desired function by the appropriate X-Y ports energized by the key closure. Thus, redefinable key 11 will access any of pages 1, 3 and 5 in the memory depending upon the position of device switch 15 to select the appropriate function digital code corresponding to the X-Y closure.

In FIG. 5 a dedicated TV key 18 is illustrated as closing a first switch 56 prior to closing a second switch 58. Switch 56 is indicated as making a Y5-X1 connection to select the memory page dedicated to TV. Switch 58, like switch 54 in FIG. 4 selects a function defined by the digital code in the memory location addressed by the X-Y ports energized by operation of dedicated TV key 18.

The sequential operation of the contact sets is necessary if the mask program option is included in the IC. That is because this option is selected by a "no connection" or "default" condition existing between Y5 and the X ports. If that option is not included, the sequential operation of the switches is not required.

For the illustrated transmitter, only three of the eight pages of memory in the IC are used. It should be apparent that not all codes on each page of memory are used, or even assigned. The added pages provide room for growth in both the manufacturer's product line and functional controls while enabling maintenance of forward and backward transmitter compatibility among the products. It should be understood however that more than one memory page may be assigned to a given controlled device, should that be desirable. Consequently, with the transmitter arrangement of the invention, a great deal of flexibility is provided in the remote control of a plurality of devices while retaining forward and backward compatibility with prior devices and control units. This flexibility is accomplished with a low cost, low power IC rather than requiring a relatively high power, high cost microprocessor.

What has been described is a novel remote control transmitter arrangement which solves the problems of the prior art. It is recognized that numerous modifications and changes in the described embodiment of the invention will be apparent to those skilled in the art without departing from the true spirit and scope thereof. The invention is to be limited only as defined in the claims.

What is claimed is:

1. A transmitter, including an integrated circuit, for transmitting coded digital control signals by operation of individual keys on a keyboard having an X-Y matrix of contacts scanned for closures by scan signals from the integrated circuit for supplying X-Y contact closure information to an integrated circuit code signal generator including a memory having different pages devoted to different devices comprising:

first membrane switch means connected to contacts in said X-Y matrix of contacts for conveying memory page selection information to said integrated circuit, said first membrane switch means each including one contact directly connected to said integrated circuit;

second membrane switch means underlying corresponding ones of said first membrane switch means and operated therewith by corresponding key closures for providing functional information to said integrated circuit such that a single key closure results in both memory page and functional information being conveyed to said integrated circuit;

a multi-position device switch, having a switchable terminal which is coupled to said integrated circuit, for selecting among different memory pages in said memory; and means for coupling the other of the contacts of certain of said first membrane switch means, corresponding to a select group of redefinable keys, to said switchable terminal of said multi-position switch.

* * * * *